United States Patent [19]

Wittman

[11] Patent Number: 4,980,778
[45] Date of Patent: Dec. 25, 1990

[54] METHOD FOR CORRECTING NONUNIFORMITIES IN PIXEL OUTPUT LEVEL FOR A LINE SCANNER

[75] Inventor: Brian A. Wittman, Indianapolis, Ind.

[73] Assignee: AT&T Bell Laboratories, Murray Hill, N.J.

[21] Appl. No.: 350,283

[22] Filed: May 11, 1989

[51] Int. Cl.⁵ ............................................... H04N 1/40
[52] U.S. Cl. ..................................... 358/446; 358/461; 358/475
[58] Field of Search ......................... 358/446, 461, 475

[56] References Cited

U.S. PATENT DOCUMENTS

| | | | |
|---|---|---|---|
| 4,133,008 | 1/1979 | Tisue | 358/446 |
| 4,408,231 | 10/1983 | Bushaw et al. | 358/446 |
| 4,554,583 | 11/1985 | Saitoh et al. | 358/163 |
| 4,633,314 | 12/1986 | Kurato et al. | 358/163 |
| 4,760,464 | 7/1988 | Sakano | 358/461 |

Primary Examiner—Edward L. Coles, Sr.
Attorney, Agent, or Firm—Michael A. Morra

[57] ABSTRACT

Scanning equipment for a low-cost facsimile machine which includes a variable gain amplifier and a comparator circuit for correcting nonuniformities in lighting, lenses, light sensors and the like. Each line of a document being scanned is subdivided into a number of picture elements that individually suffer from different degrees of nonuniformity. Stored correction signals, associated with each picture element, are used by the variable gain amplifier and the comparator in processing an analog output signal from the line scanner to thereby correct nonuniformities. In one illustrative embodiment of the invention, the stored correction signals regulate the magnitude of the line scanner's analog output signal which is then compared with a fixed black/white threshold voltage. In another illustrative embodiment of the invention, the stored correction signals are used to generate a number of black/white threshold voltages which are then compared with the line scanner's analog output signal. In all embodiments, correction signals are set during a calibration procedure that uses an illumination level which corresponds to the threshold between black and white.

5 Claims, 5 Drawing Sheets

FIG. 3
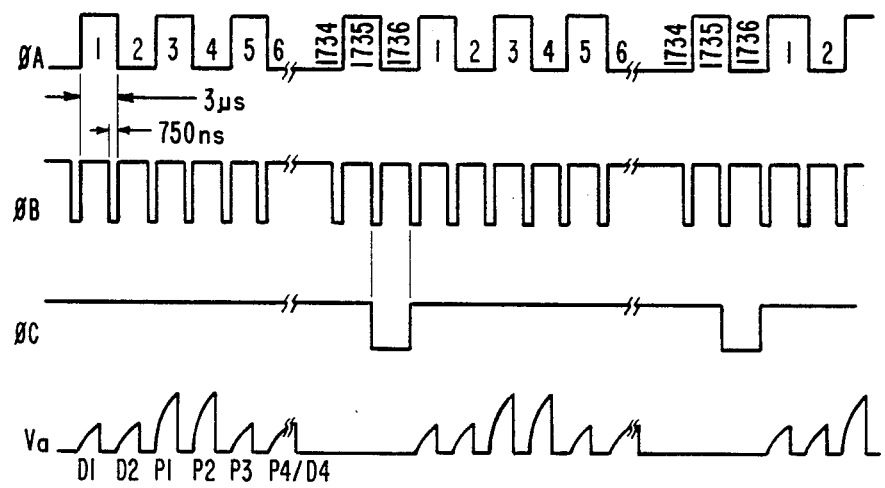
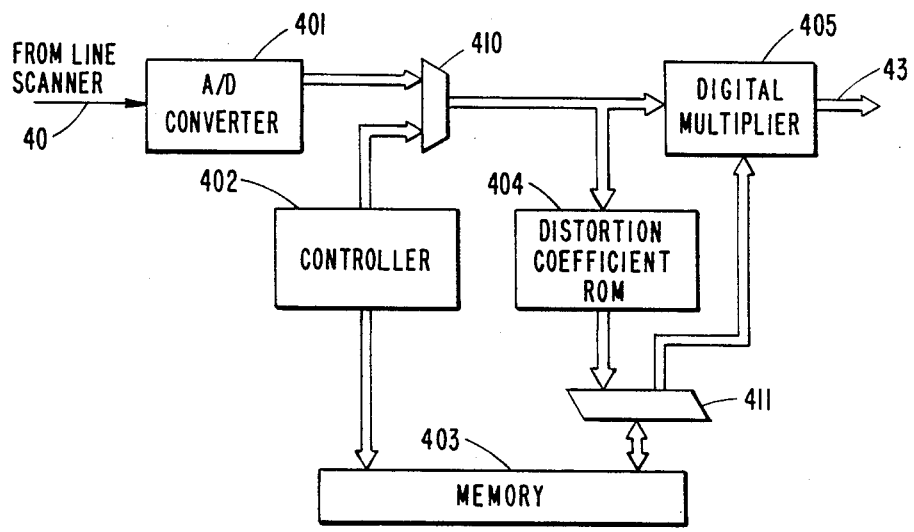
FIG. 4
(PRIOR ART)

METHOD FOR CORRECTING NONUNIFORMITIES IN PIXEL OUTPUT LEVEL FOR A LINE SCANNER

TECHNICAL FIELD

This invention relates to document scanning apparatus such as used in facsimile machines, and more particularly to a method for correcting nonuniformities in the optical system.

BACKGROUND OF THE INVENTION

Facsimile (fax) machines have been growing in popularity in recent years; so much so that the growth has been labeled "spectacular" and "unprecedented." Much to the dismay of many courier services, fax machines have been gradually replacing overnight mail delivery for business communications, especially because the communication is instantaneous rather than delayed by several hours. Furthermore, as such business products migrate into the home office environment, and ultimately the home, personal communications will constitute a significant percentage of facsimile machine usage. For such migration to occur, however, the quality of document reproduction must increase while the cost of the machine must decrease.

Group III facsimile machines subdivide each line scanned into a number of black or white picture elements (pixels). It is important that the scanning equipment be able to accurately determine whether each pixel is predominantly white or predominantly black so that faithful reproduction of a document may be accomplished. Line scanning equipment generally includes multiple light sources for illuminating the line being scanned, as well as multiple lenses and sensors for use in measuring the light that is reflected from the individual pixels. Due to the normal variation found among individual, but presumed identical components, and due to manufacturing variations there will be nonuniformities in the reproduction of each document. Fortunately, such nonuniformities do not change significantly with time and may therefore be corrected at the time of manufacture and periodically thereafter. A number of facsimile scanners use charge coupled device (CCD) arrays having all light sensors on the same semiconductor substrate. This technique eliminates some of the variation in response among the light sensing elements, but is still subject to the variation in illumination across a line which may require correction.

In some facsimile scanners using photodiode arrays, an all-white document is presented to the line scanner for the purpose of calibration. The output voltage levels produced by the individual photodiodes are converted into digital signals, processed to form correction signals, and used during normal operation of the scanner to multiply the digital value of each new output voltage produced by the photo-diodes. This process, however, requires analog-to-digital conversion of each of the photodiode output voltages and multiplication of two digital numbers which is both costly and time consuming. Typically a large number of conversions and multiplications must be performed in very short order so that customized high speed components are required. The speed with which digital multiplication may be accomplished is improved by using a look-up table (Read Only Memory - ROM) wherein the product of multiplication is stored at a location jointly addressed by the multiplicand and multiplier factors. Indeed, rather than storing merely the product of two numbers within the ROM, the functions of storing correction coefficients and multiplication can be combined in a single ROM. Here, the ROM is jointly addressed by the number of the particular pixel being scanned anbd the A/D converted output of the line scanner for that particular pixel. The output of the ROM look-up table is the corrected, A/D converted output of the line scanner. Nevertheless, high speed analog-to-digital conversion of the line scanner's output analog signal is still required and somewhat costly to implement, especially for Group III facsimile transmission. Accordingly, a high-speed, low-cost circuit for correcting nonuniformities in pixel output level for a line scanner is desirable.

SUMMARY OF THE INVENTION

The present invention includes a plurality of light sensors, each providing an analog output voltage whose magnitude varies in proportion to the level of light impinging on the sensors. Stored correction signals are used to control the gain of a variable gain amplifier whose output is delivered to a comparator circuit for one-bit analog-to-digital conversion. The output of the comparator is a binary signal indicating whether the picture element being scanned is predominantly white or predominantly black. The magnitude of the various correction signals are determined during a calibration procedure that uses an illumination level which corresponds to the threshold between black and white.

In a first illustrative embodiment of the invention, a plurality of stored correction coefficients (one for each light sensor) are used to control the gain of the variable gain amplifier whose input is the analog signal from the line scanner. The output signal from the variable gain amplifier is then compared with a predetermined black/white threshold voltage.

In a second illustrative embodiment of the invention, a plurality of stored, black/white threshold values (one for each light sensor) are used to control the gain of the variable gain amplifier whose input is a fixed reference voltage. The output signal from the variable gain amplifier is then compared with the analog signal from the line scanner.

The present invention and its associated features will be more fully understood when reference is made to the associated drawing and detailed description which follow.

BRIEF DESCRIPTION OF THE DRAWING

FIG. 3 is a timing diagram showing signal waveforms on various leads in FIGS. 1 and 2;

FIG. 4 is a prior art correcting circuit for nonuniformities in pixel output level for a line scanner;

DETAILED DESCRIPTION

PRIOR ART

Figure 1:
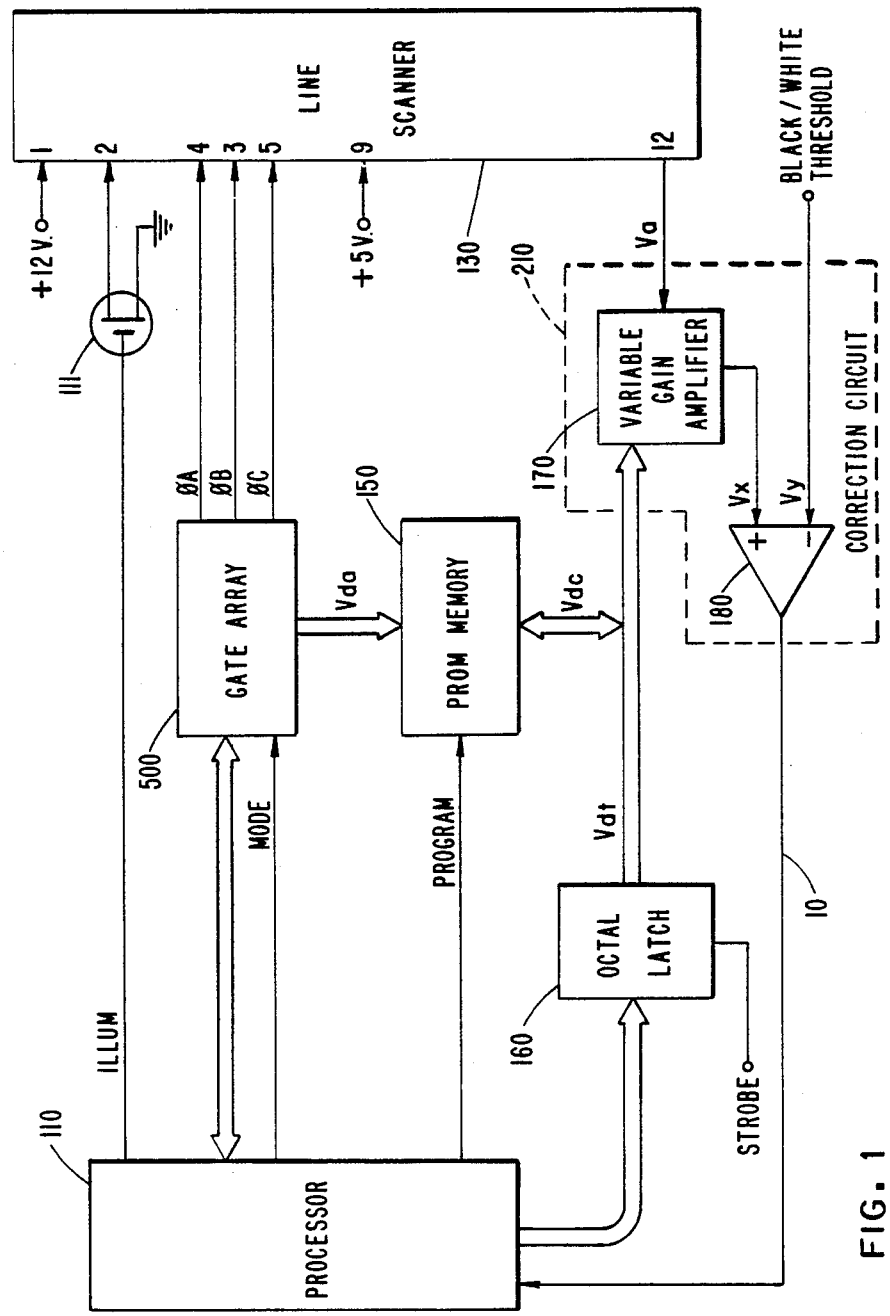
FIG. 1 discloses a block diagram of a first embodiment of an apparatus for correcting nonuniformities in pixel output level for a line scanner in accordance with the invention.

The design of FIG. 4 discloses a prior art correcting circuit for nonuniformities in pixel output level for a line scanner used by many facsimile machines today. Associated with FIG. 4, although not shown, is a line scanner comprising a linear array of photodiodes which are used to measure the illumination in a small region of a document being scanned. Each photodiode provides an analog voltage at its output that is proportional to the illumination level of the small region (picture element or "pixel"). Each analog voltage from the associated line scanner, is delivered to analog-to-digital converter 401, over lead 40, for conversion into a digital word comprising six binary digits. Unfortunately, the photodiodes are not uniformly sensitive to light across the entire array so that for a constant illumination level, such as would be experienced while scanning a black piece of paper, the output voltages from the photodiodes are different. Furthermore, the illumination level provided by light emitting diodes (LEDs) or other light sources may not be uniform across an entire line and thereby cause differences in what should be identical output voltages from the photodiodes. These differences are corrected by storing a particular multiplying number (coefficient) in memory 403 for each of the photodiodes and multiplying them in multiplier 405 with the output of each photodiodes. This is a multiplication between two digital numbers that results in a corrected digital output signal on leads 43.

Prior to document scanning, however, correction coefficients must be determined. This is accomplished by presenting a white document to the line scanner. A/D converter 401 converts the line scanner output voltage on line 40, for each pixel, into a digital number which is modified by distortion coefficient ROM404. ROM 404 is a look-up table which outputs digital words with value $K_{max}/D_{pixel}$, where $K_{max}$ is the largest expected digital output from A/D converter 401, and $D_{pixel}$ is the A/D converter output for each pixel. The purpose of ROM 404 is to facilitate pixel normalization. Such normalization generally requires division; but by storing reciprocal divisors in ROM 404, only simple multiplication is needed for generating correction coefficients. These correction coefficients are then stored in memory 403; and, during regular scanning, normalization is accomplished by multiplying the correction coefficients stored in memory 403 with the output of A/D converter 401.

This prior art process, unfortunately, requires the multiplication of two digital numbers which is both costly and time consuming. Converting the analog output signal from the line scanner into a digital number (typically 8-bits wide) requires high-speed analog-to-digital conversion at a non-trivial cost. Further, in Group III facsimile machines where only black and white picels are transmitted, this process is performed at the wite level rather than at the level where a black/white decision must be made.

NORMAL OPERATION

Figure 2:
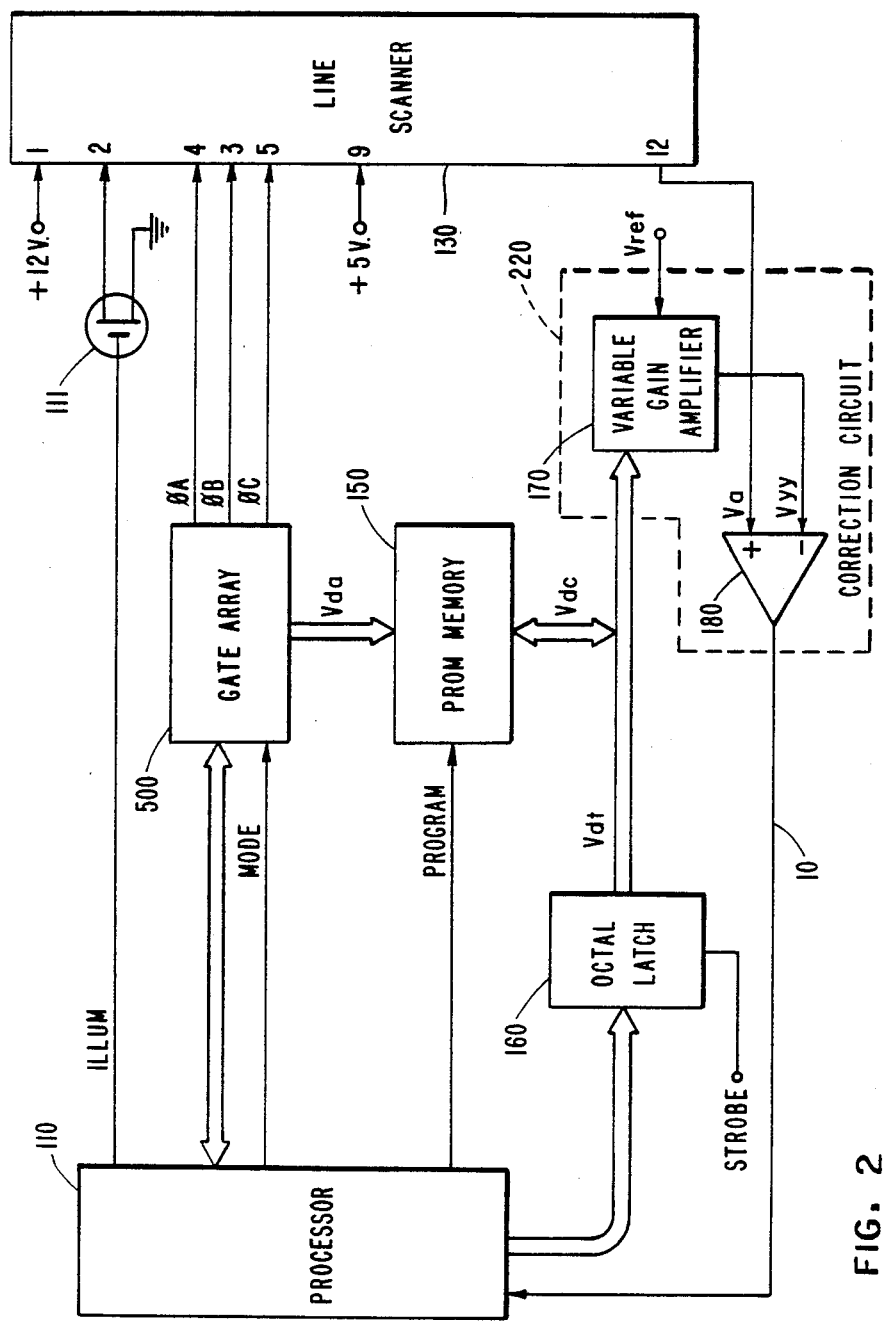
FIG. 2 discloses a block diagram of a second embodiment of an apparatus for correcting nonuniformities in pixel output level for a line scanner in accordance with the invention.

Two embodiments of the present invention are disclosed, one being shown in FIG. 1, and the other being shown in FIG. 2. Each embodiment requires a different set of stored digital correction signals. Hence the calibration processes used in obtaining these numbers are also different. In the embodiment of FIG. 1, the stored digital correction signals are used to correct the magnitude of the analog voltage $V_a$ from line scanner 130 for each of its light sensing elements. In the embodiment of FIG. 2, the stored digital correction signals are used to change the magnitude of the black/white threshold voltage against which $V_a$ is compared. These different embodiments achieve the same results using the same components, and their various implementations and calibration processes are discussed below.

The first embodiment of the present invention is shown in FIG. 1, which discloses the invention in block diagram form. Line scanner 130 is a contact-type linear image sensor such as the LSA4U030 manufactured by the Seiko Epson Corporation. This particular scanner uses amorphous silicon photodiodes that respond to the light from an array of yellow light emitting diodes (wavelength 570 nm). The scanner includes 1736 photodiodes which yield an effective resolution of 8 pixels/mm. Line scanner 130 is supplied with various voltages for powering its operation. Gate array 500 provides a source of timing signals on input terminals 3,4, 5, these signals being shown in greater detail in FIG. 3. The scanner is adapted to deliver a line of scan data every 5.2 ms. Each line comprises 1736 picture elements (pixels), and each pixel is represented by a logic "1" or "0" to indicate a predominantly white or predominantly black region of the document being scanned. Different transmission rates may be accommodated, for example, by "throwing away" one out of every two scan lines, or three out of every four scan lines, etc. Scanner 130 includes a plurality of light emitting diodes (LEDs) whose power is controlled on input terminal 2 by an illumination signal (ILLUM) supplied by processor 110. The designer may wish to turn off the illumination LEDs when a scan line is to be thrown away or while a stepping motor advances the document being scanned. Transistor 111 is selected to "sink" current which has been supplied to the LED array of line scanner 130 on input terminal 1.

Processor 110 is a 16-bit, single-chip microcomputer with an 8-bit external data bus such as the commercially available PD70322 from NEC Electronics Inc. Its internal clock is arranged to operate at 8 MHz.

Referring briefly to FIG. 3, three timing waveforms $\Phi_A$, $\Phi_B$, and $\Phi_C$ are shown along with analog output signal $V_a$ from the scanner. Clock $\Phi_A$ supplies transitions to scanner 130 every 3 microseconds, which represents the allotted time for determining whether the region being scanned is white or black. In the diagram of FIG. 3, the $\Phi_A$ clock signal is numbered according to the particular pixel being scanned (i.e., 1-1736). Clock $\Phi_B$ operates at twice the frequency of clock $\Phi_A$ and has a 75% duty cycle as shown. Negative-going transition of $\Phi_B$ substantially correspond with the optimum sampling time of output signal $V_a$. During the scanning of each line, the illumination level of each pixel is represented by the analog voltage level of output signal $V_a$ at the appropriate sampling time. The present invention is directed to a novel apparatus and method for processing this analog voltage level in a manner that economically and accurately determines whether it is to be classified as predominantly white or predominantly black at the sampling instant. Such processing advantageously removes the effect of unequal illumination levels across a scan line; variations in sensitivity of the individual photodiodes that measure the illumination; and defects in the manufacture and positioning of associated lenses.

Completing the discussion of the FIG. 3 waveforms, it is noted that certain picture elements are designated as dummy bits D1–D4, while pixels 1735 and 1736c are black bits. This reduces the effective number of pixels (P1,P2 . . . ) to 1730. Clock $\Phi_c$ pulses low at the end of each scan line.

Attention is now directed to the processing of the waveform designated $V_a$ which, at the appropriate sampling time, represents the intensity of light detected by a light sensor in a small region (pixel) of a document being scanned. For each pixel, waveform $V_a$ charges toward some voltage proportional to the detected light intensity and, then, returns to zero.

Returning now to the embodiment of FIG. 1, output signal $V_a$, from line scanner 130, is available on terminal 12 and delivered to correction circuit 210 comprising variable gain amplifier 170 and comparator 180. Variable gain amplifier 170 is a commercially available, high speed, 8-bit multiplying digital-to-analog converter such as the DAC-08 from Motorola. This device is a linear amplifier having a number of discrete gain settings. These gain settings are controlled by binary voltages present on each of its eight input terminals. During normal operation, octal latch 160 - which is operative to deliver a signal $V_{dt}$ to amplifier 170, as discussed below - is not used. The gain settings of variable gain amplifier 170 are controlled by digital correction signal $V_{dc}$, stored in PROM memory 150. One correction signal is stored for each light sensing element and used to modify the individual magnitudes of $V_a$. Thus, nonuniformities in the light illumination and sensing equipment can be corrected on a pixel by pixel basis. The output signal from variable gain amplifier 170 is designated $V_x$ and looks very much like the waveform $V_a$, shown in FIG. 3, except that the individual pulses have different relative magnitudes.

Comparator 180 compares voltage $V_x$ with a predetermined, fixed threshold voltage, designated $V_y$, that sets the threshold between black and white pixels. That is to say, when output analog voltage $V_a$ from line scanner 130, after corrective adjustment by amplifier 170, exceeds black/white threshold voltage $V_y$, the output signal from comparator 180 on line 10 is a logical "1" - signifying that the pixel presently being scanned is predominantly white. Similarly, when $V_a$ is less than $V_y$, the output signal from comparator 180 on line 10 is a logical "0" - signifying that the pixel presently being scanned is predominantly black. Such voltage comparators are well known and commercially available from a number of vendors. It is recognized that black/white threshold voltage $V_y$ may vary from unit to unit, and one might think that it requires adjustment to correctly set the proper gray level threshold. Advantageously, this is not necessary because even this variation is accounted for in the calibration process where the stored correction signals are selected. As will be discussed in greater detail hereinafter, the stored correction signals are chosen for each particular facsimile scanner with all of its components operating in their normal state so that the output of comparator 180 just changes state (from black to white) when the scanner is responding to the illumination from a sheet of gray paper whose particular shading defines the black/white threshold.

A second embodiment of the present invention is shown in FIG. 2. In this drawing, rather than storing a plurality of correction signals for adjusting the magnitude of analog voltages $V_1$, a technique is disclosed for storing a plurality of correction signals that represent various black/white threshold voltages to achieve the same result. Correction circuit 220 comprises the same variable gain amplifier 170 and comparator 180 as shown in FIG. 1, although the interconnections are different and the correction numbers used are different. Stored in PROM MEMORY 150 of FIG. 2 are a plurality of digital correction signals, $V_{dc}$, which are delivered to variable gain amplifier 170. These correction signals are used to control the gain of amplifier 170 whose input signal is a DC voltage level designated "$V_{ref}$". The output of amplifier 170, designed $V_{yy}$, operates as a variable black/white threshold voltage against which analog voltages $V_1$ is compared at the appropriate sampling time. When output analog voltage, $V_a$, from line scanner 130 exceeds black/white threshold voltage $V_{yy}$, the output signal from comparator 180 on line 10 is a logical "1" - signifying that the pixel presently being scanned is predominantly white. Similarly, when $V_a$ is less than $V_{yy}$, the output signal from comparator 180 on line 10 is a logical "0" - signifying that the pixel presently being scanned is predominantly black.

CALIBRATION

Attention is now focused on the calibration procedure by which the correction signals are determined for each of the embodiments of FIG. 1 and FIG. 2. A calibration process is now described through which variations in the output signal $V_1$, for a fixed illumination, are corrected. Whereas prior art systems have used a white level for this purpose, the present apparatus uses a gray level. Furthermore, the particular gray level chosen is exactly the threshold at which a black/white decision is made. Although use of the white calibration level provides reasonably good results because a linear relationship exists between illumination level and output voltage, it is still better not to assume linearity, but rather to make all calibrations at the predetermined threshold. Nevertheless, this calibration technique allows the designer to use highly nonlinear light sensors should it ever become cost effective to do so. Prior to the calibration procedure, which may take place either in the factory or at a customer location, a sheet of gray paper is positioned within the facsimile machine for scanning by line scanner 130. The particular gray paper selected will thereafter be the threshold reference for distinguishing white and black picture elements. It is noted that Group III facsimile machines, where this invention finds advantageous use, only transmit black/white information - different levels of gray are not transmitted. Referring to FIG. 1 now, calibration consists of two phases:

Phase I—Correction Coefficient Measurement and Calculation

Phase III—PROM programming

Phase I

During Phase I, PROM memory 150 is deactivated and scanner 130 makes successive scans every 20.8 ms. On the first scan, processor 110 writes decimal 75 ($75_{10}$) to the output of octal latch 150 as a first trial correction signal. The trial correction signal $V_{dt}$ is digital and comprises eight binary digits. $V_{dt}$ is delivered, over 8 parallel leads, to variable gain amplifier 170 to select the amplification level for analog input signal $F_a$.

Octal latch 160 operates generally as a sample-and-hold circuit comprising eight, high speed, D-type flip flops. Data on their D inputs, meeting the setup and hold time requirements, are transferred to the Q outputs on positive-going transitions of a clock input signal. One suitable device is the MM74HC374 Octal D-Type Flip-Flop which is commercially available from National Semiconductor Corporation. In the present application, the D inputs are connected to a bus from processor 110 which is eight bits wide and provides binary digital number from $75_{10}$ to $225_{10}$ (i.e., from MSB 01001011 LSB to MSB 11111111 LSB). These binary digital numbers a read into octal latch 160 when a positive-going transition is delivered, via the STROBE lead, to the clock inputs of the eight flip flops. After the positive-going transition occurs, the binary digital number is available on the Q outputs of the eight flip flops as signal $V_{dt}$.

The result of amplifying $V_a$ and $V_{dt}$ is analog voltage $V_x$ which is compared in magnitude with a predetermined black/white threshold voltage $V_y$ using comparator 180. The output signal from the comparator 180 is delivered to processor 110 over line 10 for storage in system memory where 1736 bits of serial scan data are stored. This process continues for 180 scans with processor 110 incrementing the trial correction signal $V_{dt}$ by one unit on each successive scan. The 180 scans require approximately 3.7 seconds to complete. During this process, a solid piece of gray paper with a 0.5 density is being "looked at" by the scanner. Actually, 180 scans will not always be required to complete the calibration. Once all the valid pixel bits of a scan line have changed state, the calibration can be stopped since more scans will yield no new information.

The accuracy with which the present invention is able to distinguish black/white information is directly attributable to the process of selecting a correction factor for each light sensing element as it responds to a threshold illumination. In a second embodiment of the invention (see FIG. 2), rather than selecting 1736 correction factors to modify the individual magnitudes of $V_a$, 1736 values of the black/white threshold voltage $V_y$ are selected - one for each light sensing element.

The calibration procedures for the illustrative embodiments of FIG. 1 and FIG. 2 are substantially identical. Simply stated, on successive scans, processor 110 increments the magnitude of trial correction signal $V_{dt}$ that is delivered to octal latch 160; it is temporarily stored and used to control the gain of variable gain amplifier 170. Those of the 1736 pixels that change state on that particular scan are all assigned the same correction signal. For example, if the 1009th pixel changes during the tenth scan ($84_{10}$ being the output of processor 110 during the tenth scan), then $84_{10}$ is the correction signal that needs to be stored at the corresponding address of PROM memory 150.

Specifically referring to the illustrative embodiment of FIG. 1, during the calibration procedure when $V_{dt}$ was $84_{10}$, it was this particular "gain," which amplified $V_a$, and caused $V_x$ to exceed $V_y$ - the black/white threshold level of comparator 180. In this embodiment, note that the logic state at the output of comparator 180 changes from "0" to "1" as the trial correction number $V_{dt}$ increases in magnitude. During normal operation, white pixels correspond to a logic "1" at the output of comparator 180.

Specifically referring to the illustrative embodiment of FIG. 2, during the calibration procedure when $V_{dt}$ was $84_{10}$, it was this particular "gain," which amplified $V_{ref}$ and caused $V_{yy}$ to exceed $V_a$. In this embodiment, note that the logic state at the output of comparator 180 changes from "1" to "0" as the trial correction signal $V_{dt}$ increases in magnitude. Nevertheless, during normal operation, white pixels correspond to a logic "1" at the output of comparator 180.

Phase II

Figure 5:
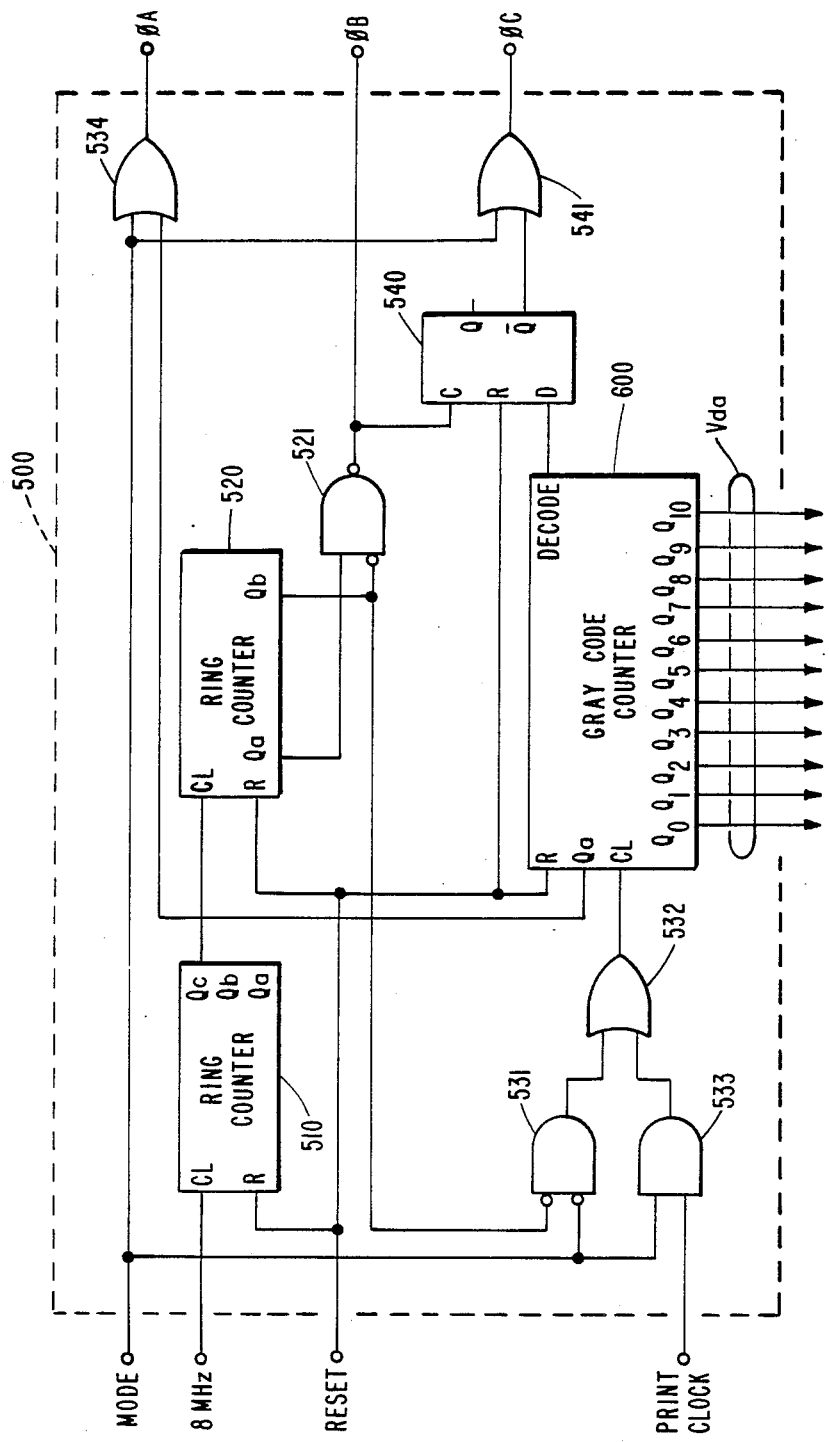
FIG. 5 discloses, in block diagram form, various circuits within the gate array of FIGS. 1 and 2 that pertain to the document scanning function.

Before discussing the actual programming of PROM memory 150, accomplished during Phase II, a discussion of gate array 500, disclosed in FIG. 5, would improve understanding. Gate array 500 provides customized timing logic for handling the scanning and printing functions of a facsimile machine. Since the present invention is concerned with the scanning function, only that portion of the gate array is discussed.

Referring now to FIG. 5 which discloses that portion of gate array 500 that relates to the scanning function, the MODE signal input from processor 110 is made high during Phase II. "OR" gate 541 responds to the high state of the MODE signal to disable clock signal $\Phi_C$ which is delivered to the line scanner. Before programming PROM memory 150 (see FIG. 1), Gray code counter 600 is initialized to a (MSB 00000000000 LSB) state via the RESET input signal.

Gray code counter 600 is an 11-bit counter which counts in Gray code (rather than straight binary) to avoid certain requirements imposed by manufacturers of gate arrays on the number of output pins that can be simultaneously changed. The Gray code has the property that the next state can be achieved by changing only one output bit. During normal scanner operation, the counter begins at a (MSB 00011010010 LSB) state. This Gray code state corresponds to $156_{10}$. After 1735 more clock pulses, the Gray code counter will be in a (MSB 10011010010 LSB) state which corresponds to the 1736th bit from the line scanner (this pixel is a black or no output). The next clock pulse will bring the Gray code counter 600 to the (MSB 00011010010 LSB) state. The following table illustrates the Gray code counter relationships during normal scanner operation:

| Clock Pulse | Counter Output | Dec. Equiv | Scanner Video |
|---|---|---|---|
| 1 | (MSB 00011010011 LSB) | 157 | Dummy Bit 1 |
| 2 | (MSB 00011010001 LSB) | 158 | Dummy Bit 2 |
| 3 | (MSB 00011010000 LSB) | 159 | Pixel 1 |
| 4 | (MSB 00011110000 LSB) | 160 | Pixel 2 |
| 1730 | (MSB 00011110001 LSB) | 1886 | Pixel 1728 |
| 1731 | (MSB 00011110000 LSB) | 1887 | Pixel 1729 |
| 1732 | (MSB 00011010000 LSB) | 1888 | Pixel 1730 |
| 1733 | (MSB 00011010001 LSB) | 1889 | Dummy Bit 3 |
| 1734 | (MSB 00011010011 LSB) | 1890 | Dummy Bit 4 |
| 1735 | (MSB 00011010010 LSB) | 1891 | No output |
| 1736 | (MSB 00011010010 LSB) | 156 | No output |

After Gray code counter 600 is reset by processor 110, it exists in the (MSB 00000000000 LSB) state. This state does not occur during normal scanner operation. To reach the effective "1" state (MSB 00011010011 LSB), shown in the table above, exactly 157 clock transitions are required. Thus the counter address which corresponds with Pixel 1 can be arrived at by resetting line scanner 130 and providing exactly 159 clock pulses on the PRINT CLOCK input lead to gate array 500. Knowing this correspondence between pixel number and the number of clock pulses is critical since the correction factors programmed into PROM memory 150 must correspond in time with their respective pixels.

Figure 6:
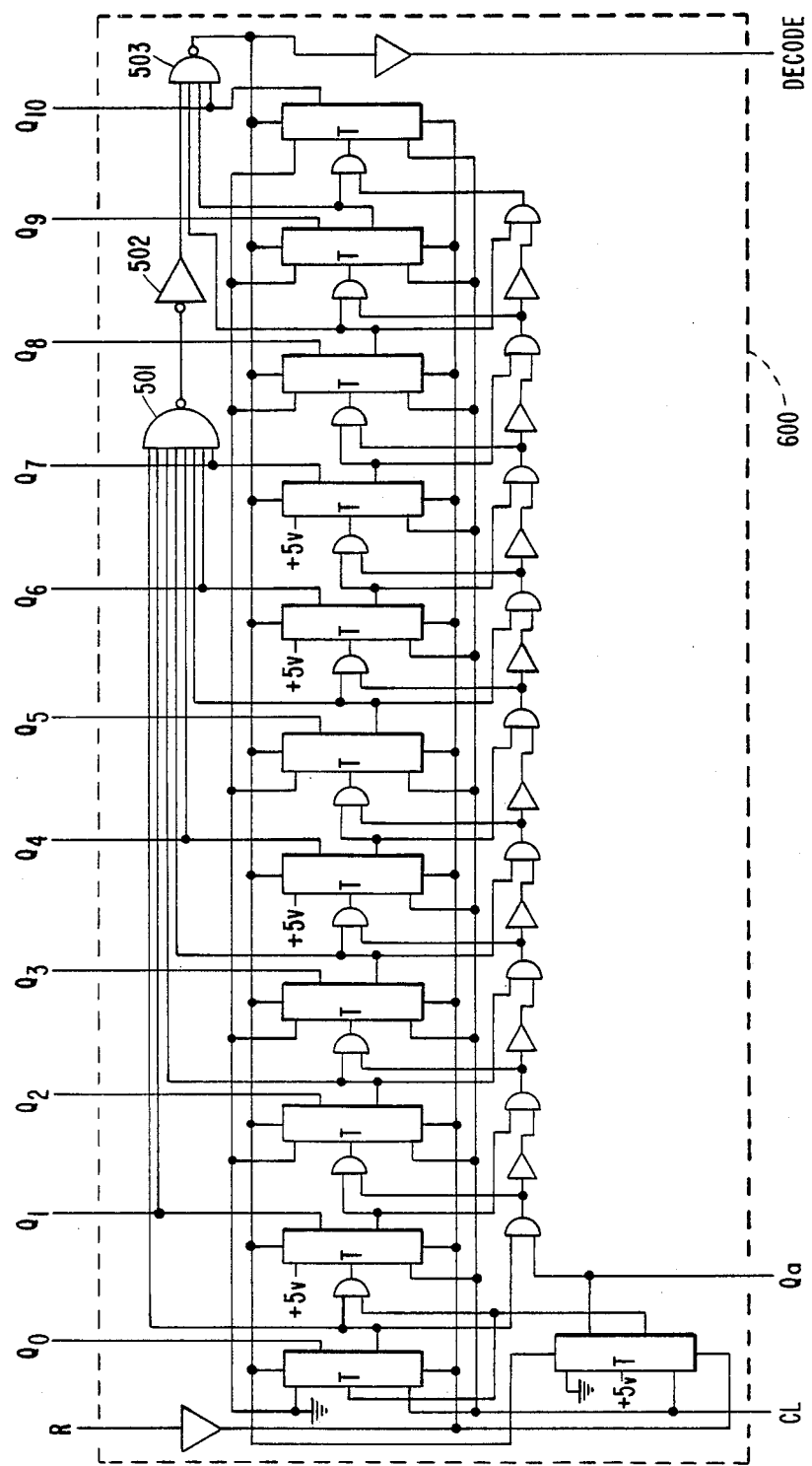
FIG. 6 discloses a more detailed schematic diagram of a Gray code counter such as used in the FIG. 5 gate array.

For completeness, a detailed schematic of Gray code counter 600 is shown in FIG. 6. Counter 600 includes gates 501-503 which are configured to detect Grau code state (MSB 00011010010 LSB), which corresponds to $1891_{10}$. The output signal, labeled DECODE, celebrates this event by going high. On the very next count, registers $Q_0 \ldots Q_{10}$ are set to Gray code state (MSB 00011010010 LSB) which corresponds to $1561_{10}$. Counter 600 therefore counts between $1561_{10}$ and $1891_{10}$ and then starts all over again. The flip flops used in FIG. 6 are reset asynchronously on input lead "R". The flip flops of FIG. 6 are arranged to synchronously toggle when a "1" is on their "T" input terminal, but remain unchanged when a "0" is there. Note. that the $Q_4$ flip flop has its "T" input terminal permanently corrected to +5 volts (logic "1"), thereby causing its output signal $Q_4$ to change state on every toggling transition of the CL clock signal. Thus, output signal $Q_4$ is a square wave at one-half the CL clock frequency.

PROM memory 150 is a high-speed 16,384-bit (2k×8), electrically reprogrammable EEPROM such as the X2816B, available from Xicor Corporation. It is designed to operate with a single +5 volt power supply and features static operation whereby no clocks are required. Eight data output leads, designated $V_{dc}$, and elevan address inputs, designated $V_{da}$, are TTL, CMOS compatible. The PROGRAM lead allows a designer to prepare PROM memory 150 for programming.

During phase II, PROM memory 150 is programmed with the correction numbers measured during phase I. During phase II, processor 110 drives the MODE signal to its high state thereby disabling signal $\Phi_C$ to the line scanner (see FIG. 5). Processor 110 now delivers the correction signals, eight parallel bits each, to the data output pins of PROM memory 150 designated $V_{dc}$. This is accomplished over a path that includes octal latch 160. Furthermore, the addresses where these correction signals are to be stored are selected by address signal $V_{da}$ from gate array 500.

It is understood that various modifications are possible within the spirit and scope of the invention. Such modifications include, but are not limited to, obtaining correction signals by any method to digitally control the gain of a variable gain amplifier in the manner taught by the present invention; and the use of a single light sensing element or a CCD array, rather than the photodiode array shown in the present invention.

I claim:

1. In scanning equipment for a facsimile machine or the like having light sensors responsive to illumination of individual picture elements of a document, the light sensors generating an output voltage whose magnitude is proportional to the illumination of each picture element, a method for calibrating the scanning equipment to correct for nonuniformities in the light sensors comprising the steps of:
providing a predetermined illumination level to the light sensors which corresponds to the threshold between black and white;
amplifying the output voltage from the light sensors in a variable gain amplifier,
comparing the amplified output voltage with a reference voltage;
increasing the gain of the variable gain amplifier until the amplified output voltage exceeds the reference voltage; and
storing in memory, the gain of the amplifier which first caused the amplified output voltage to exceed the reference voltage.

2. In scanning equipment for a facsimile machine or the like having light sensors responsive to illumination from individual pictrure elements of a document, the light sensors generating an output voltage whose magnitude is proportional to the illumination of each picture element, a method for calibrating the scanning equipment to correct for nonuniformities in the light sensors comprising the steps of:
providing a predetermined illumination level to the light sensors which corresponds to the threshold between black and white;
amplifying the output voltage from the light sensors in a variable gain amplifier;
comparing the amplified output voltage with a reference voltage;
decreasing the gain of the variable gain amplifier until the amplified output voltage becomes less the reference voltage; and
storing in memory, the gain of the amplifier which first caused the amplified output voltage to become less the reference voltage.

3. In scanning equipment for a facsimile machine or the like having at least one photosensor responsive to illuminatino from individual picture elements of a document, the photosensor generating an output voltage whose magnitude is proportional to the illumination of each picture element, a method for calibrating the scanning equipment to correct for nonuniformities in the photosensor comprising the steps of:
providing a predetermined illumination level to the photosensor which corresponds to the threshold between black and white;
comparing the output voltage of the photosensor with a reference voltage;
increasing the magnitude of the reference voltage until it exceeds the magnitude of the output voltage of the photosensor; and
storing in memory, a number related to the magnitude of the reference voltage which first exceeded the output voltage of the photosensor.

4. In scanning equipment for a facsimile machine or the like having at least one photosensor responsive to illumination from individual picture elements of a document, the photosensor generating an output voltage whose magnitude is proportional to the illumination of each picture element, a method for calibrating the scanning equipment to correct for nonuniformities in the photosensor comprising the steps of:
providing a predetermined illumination level to the photosensor which corresponds to the threshold between black and white;
comparing the output voltage of the photosensor with a reference voltage;
decreasing the magnitude of the reference voltage until it becomes less than the magnitude of the output voltage of the photosensor; and
storing in memory, a number related to the magnitude of the reference voltage which first became less than the output voltage of the photosensor.

5. A method for generating correction signal to compensate for nonuniformities in Group III facsimile equipment, the equipment including a linear array of photodetectors that are responsive to the illumination of individual picture elements for generating output voltages whose magnitudes are proportional to the illumination of the picture elements, the equipment further including means for amplifying the output voltages by amounts controlled by correction signals associated with each photodetector; for each photodetector in the array the method comprises the steps of:

(i) providing a predetermined illumination level to the photodetector which corresponds to the threshold between black and white to generate a trial voltage;
(ii) amplifying the trial voltage by a predetermined amount;
(iii) comparing the amplified trial voltage with a reference voltage;
(iv) increasing the predetermined amount by a fixed increment;
(v) repeating steps (ii) through (iv) until the amplified trial voltage exxceeds the reference voltage; and
(vi) storing the predetermined amount which caused the amplified trial voltage to exceed the reference voltage as the correction signal.

* * * * *